(12) United States Patent
Chang

(10) Patent No.: US 7,121,951 B2
(45) Date of Patent: Oct. 17, 2006

(54) CONNECTING SHAFT DEVICE

(76) Inventor: Sheng-Ming Chang, No. 32, Sioushan 5thRd., Daya Township, Taichung County 428 (TW)

( * ) Notice: Subject to any disclaimer, the term of this patent is extended or adjusted under 35 U.S.C. 154(b) by 41 days.

(21) Appl. No.: 10/788,553

(22) Filed: Feb. 26, 2004

(65) Prior Publication Data
US 2005/0192105 A1   Sep. 1, 2005

(51) Int. Cl.
*F16D 3/221* (2006.01)
(52) U.S. Cl. ............... 464/139; 81/177.85; 403/322.2; 464/901
(58) Field of Classification Search .............. 464/106, 464/112, 139–143, 19, 901; 403/56, 57, 403/59, 322.2, DIG. 6; 81/177.75, 177.85; 279/905
See application file for complete search history.

(56) References Cited

U.S. PATENT DOCUMENTS

| 3,180,435 | A | * | 4/1965 | McHenry | 464/901 |
| 3,551,013 | A | * | 12/1970 | Wills et al. | 464/901 |
| 4,941,862 | A | * | 7/1990 | Hazebrook et al. | 464/141 |
| 5,267,905 | A | * | 12/1993 | Wenzel et al. | 464/140 |
| 6,874,392 | B1 | * | 4/2005 | Wu | 81/177.85 |
| 2004/0126182 | A1 | * | 7/2004 | Lin | 403/322.2 |

OTHER PUBLICATIONS

SAE Universal Joint and Driveshaft Design Manual, AE-7, Society of Automotive Engineers Inc., Warrendale PA, pp. 149 & 150, TJ1079.S62 1979.*

* cited by examiner

*Primary Examiner*—Greg Binda
(74) *Attorney, Agent, or Firm*—Charles E. Baxley

(57) ABSTRACT

A connecting shaft includes a fixed connecting part on one end and a connecting part on the other end for engaging with a socket, the connecting part is in curved part, a shoulder for connecting to the inner circumference of the socket is disposed between the connecting part and the connecting shaft, the purpose of the shoulder is for the connecting shaft to be able to turn or position with the socket, an axial hole is disposed inside the connecting part for a axial rod to insert into, a ball hole is disposed on each side of the connecting part and the two ball holes are connected to the axial hole, a steel ball is inserted into each ball hole, when the axial rod moves, it will also drives the two steel balls to move, one end of the axial rod is connected to a sliding control element, so that the sliding control element will drive the axial rod to move together on the axis, so as to control the two steel balls to allow the socket to turn upon the connecting shaft or to engage together in position.

6 Claims, 7 Drawing Sheets

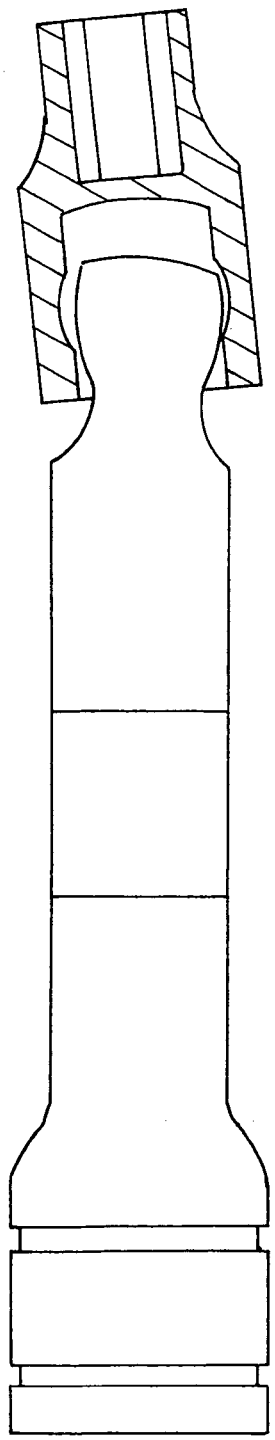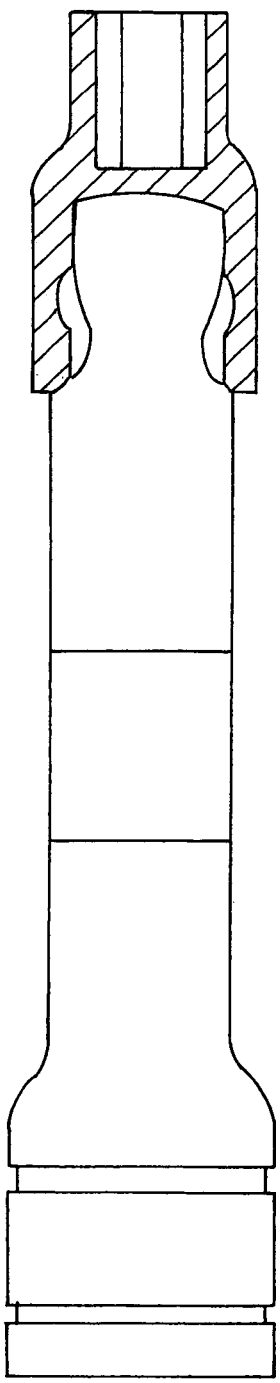
FIG 4
PRIOR ART
FIG 3
PRIOR ART

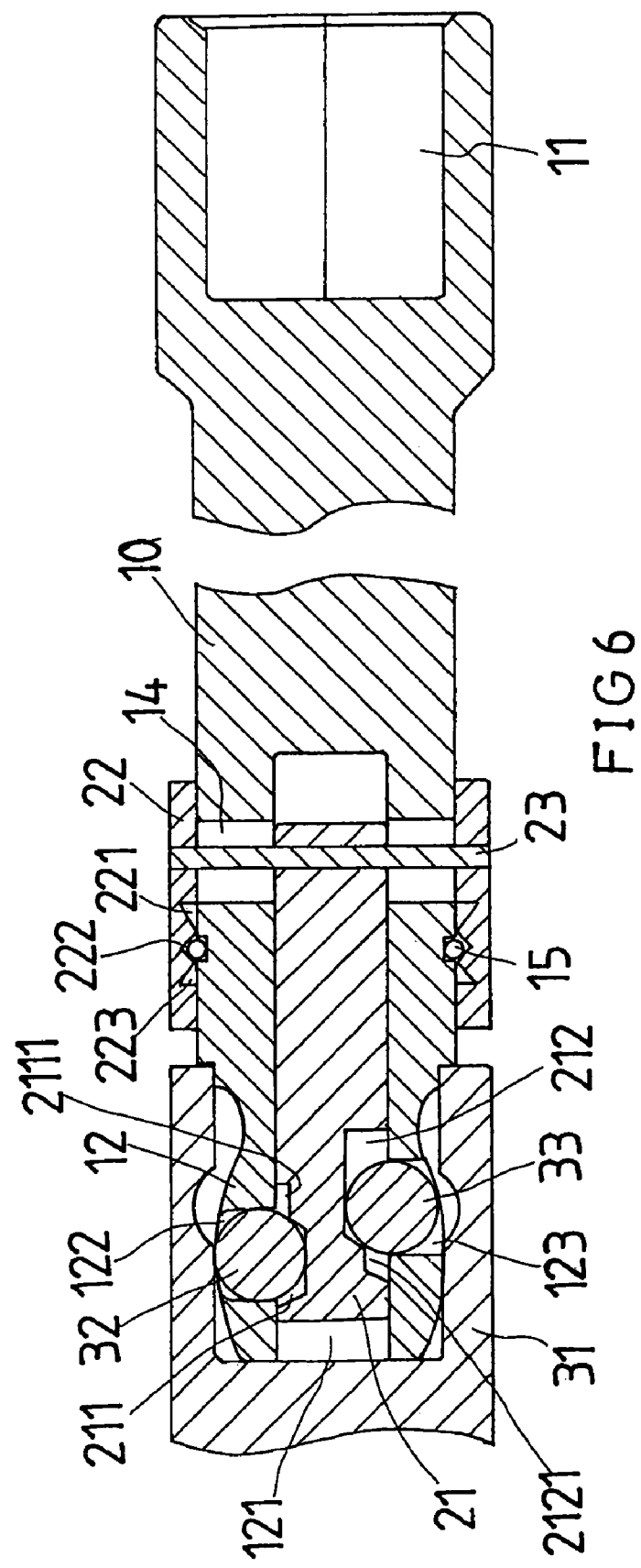

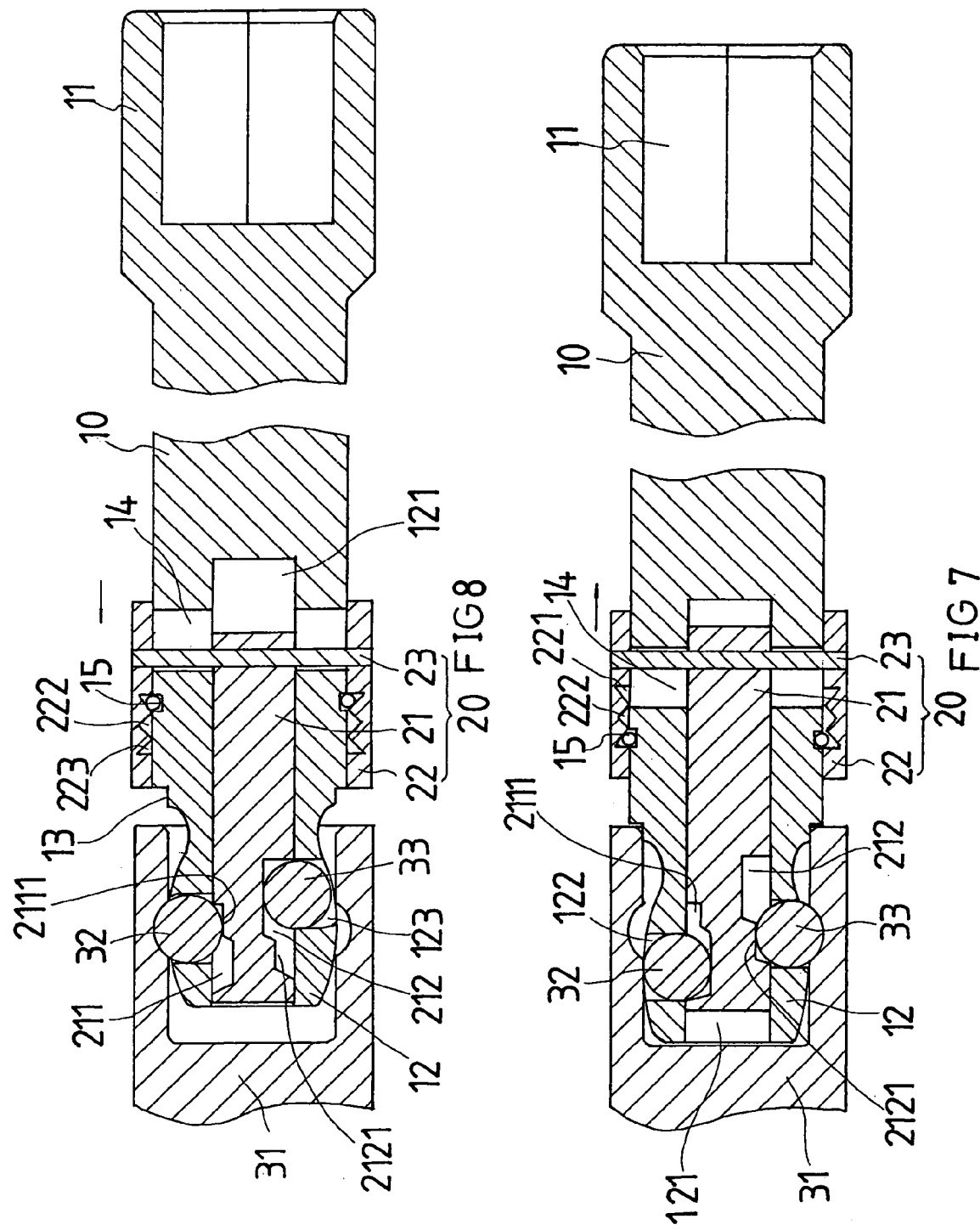

CONNECTING SHAFT DEVICE

BACKGROUND OF THE INVENTION

Conventional power driven tools for socket structure are normally driven either manually or by electrical power. Electrical tools are usually connected to pneumatic power source to take advantage of the output of compression air to provide constant torque to achieve locking operations. Pneumatic tools usually use torque connecting shaft to output torque to achieve locking purpose.

Referring to FIG. 1, illustrated is a conventional torque connecting shaft 91 which includes a protruded sleeving part 911 and a sleeving hole 912 provided at each end of the shaft, for connecting to a pneumatic tool and for engaging with a socket. This type of conventional torque shaft can only work on a straight line and if the socket required to be locked is located away from the straight line, it will be difficult to reach the socket. Besides, when the torque connecting shaft 91 is connecting with the socket, the protruded sleeving part 911 engages with the socket. It is not convenient to adjust a steel ball 913, so that when engaging with the socket, it will not be easy to operate speedily. Referring to FIG. 2, illustrated is another conventional connecting shaft, arranged for a socket to easily engage onto the shaft, but the protruded sleeving part can only be operated in straight direction and cannot turn to the other angular positions.

Referring to FIGS. 3 and 4, another connecting shaft is shown and allows a limited turning angle, a driven head is disposed at one end of the connecting shaft, a positioning ball is disposed on the driven head at a desirable location, a concave part is located between the driven head and the positioning ball. Referring to FIG. 3, in operation, the connecting shaft and the socket can be connected in a straight manner, the socket can also turn within a limited angle on the connecting shaft as referring to FIG. 4. When in a straight manner, the positioning ball can help to position the tool. But when it operates in the manner of angle turning, the connection between the connecting shaft and the socket depends only on a simple insertion mechanism, there is no element to help positioning, if the operating angle is not suitable the socket will easily fall apart from the connecting shaft. Even though the positioning ball can achieve positioning function when operating in a straight manner, the socket can still detach from the connecting shaft when the force acting on the socket from a pneumatic tool is bigger than the positioning force of the ball. Thus will affect safety of using the tool.

SUMMARY OF THE INVENTION

The present invention is to provide a connecting shaft and a socket, when the socket is engaging with the connecting shaft, the socket can work on both straight and angle turning manners with stably positioning capability.

The present invention will become more fully understood by reference to the following detailed description thereof when read in conjunction with the attached drawings.

BRIEF DESCRIPTION OF THE DRAWINGS

FIG. 3 is a perspective view of a conventional connecting shaft operating in straight and fixed direction;

FIG. 4 is a perspective view of a conventional connecting shaft operating in angle turning manner;

FIG. 6 is a sectional assembly view of the present invention;

FIG. 7 is a sectional assembly view of the present invention operating in straight and fixed direction;

FIG. 8 is a sectional assembly view of present invention operating in angle turning manner;

DETAILED DESCRIPTION OF THE PREFERRED EMBODIMENT

Figure 1:
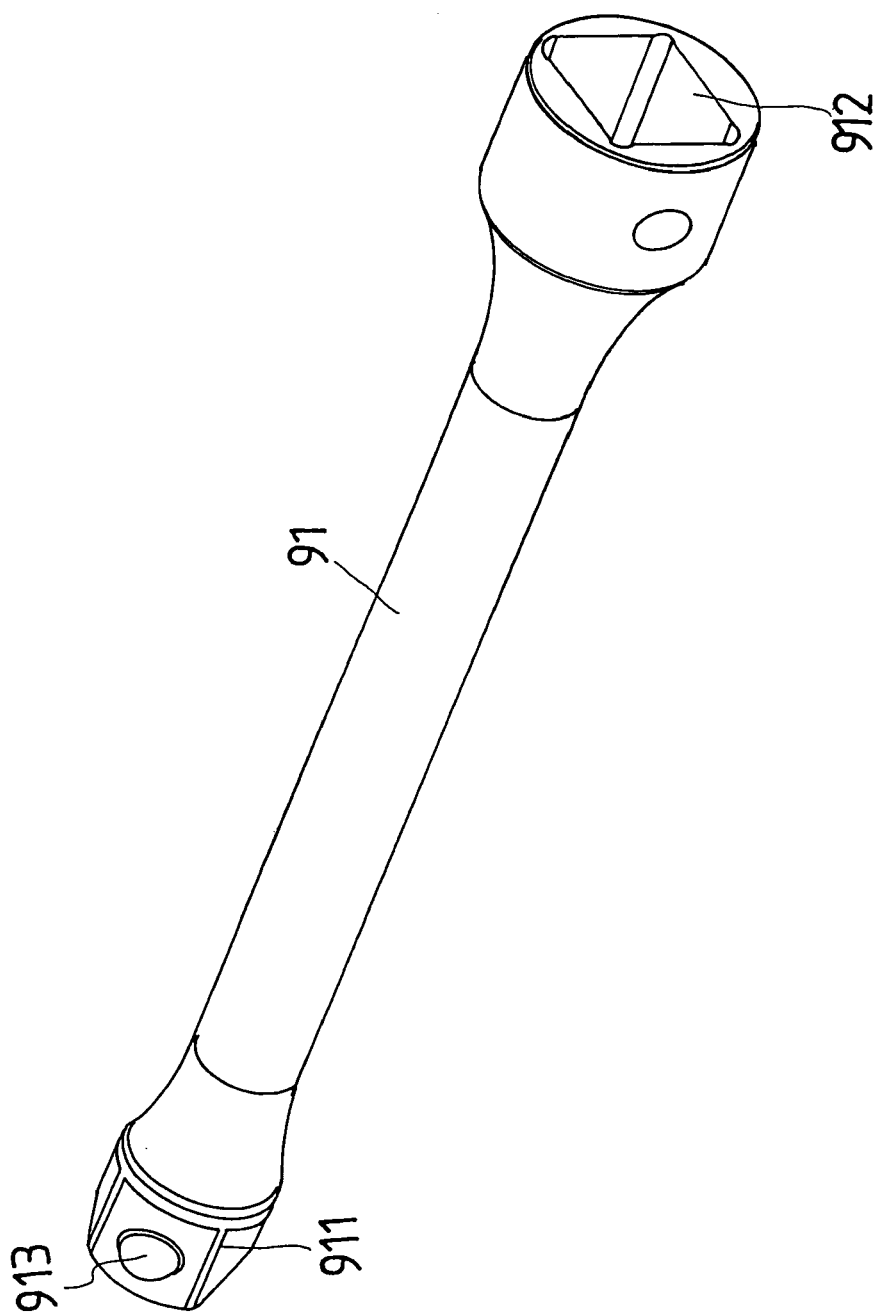
FIG. 1 is a perspective view of a conventional torque connecting shaft.
Figure 2:
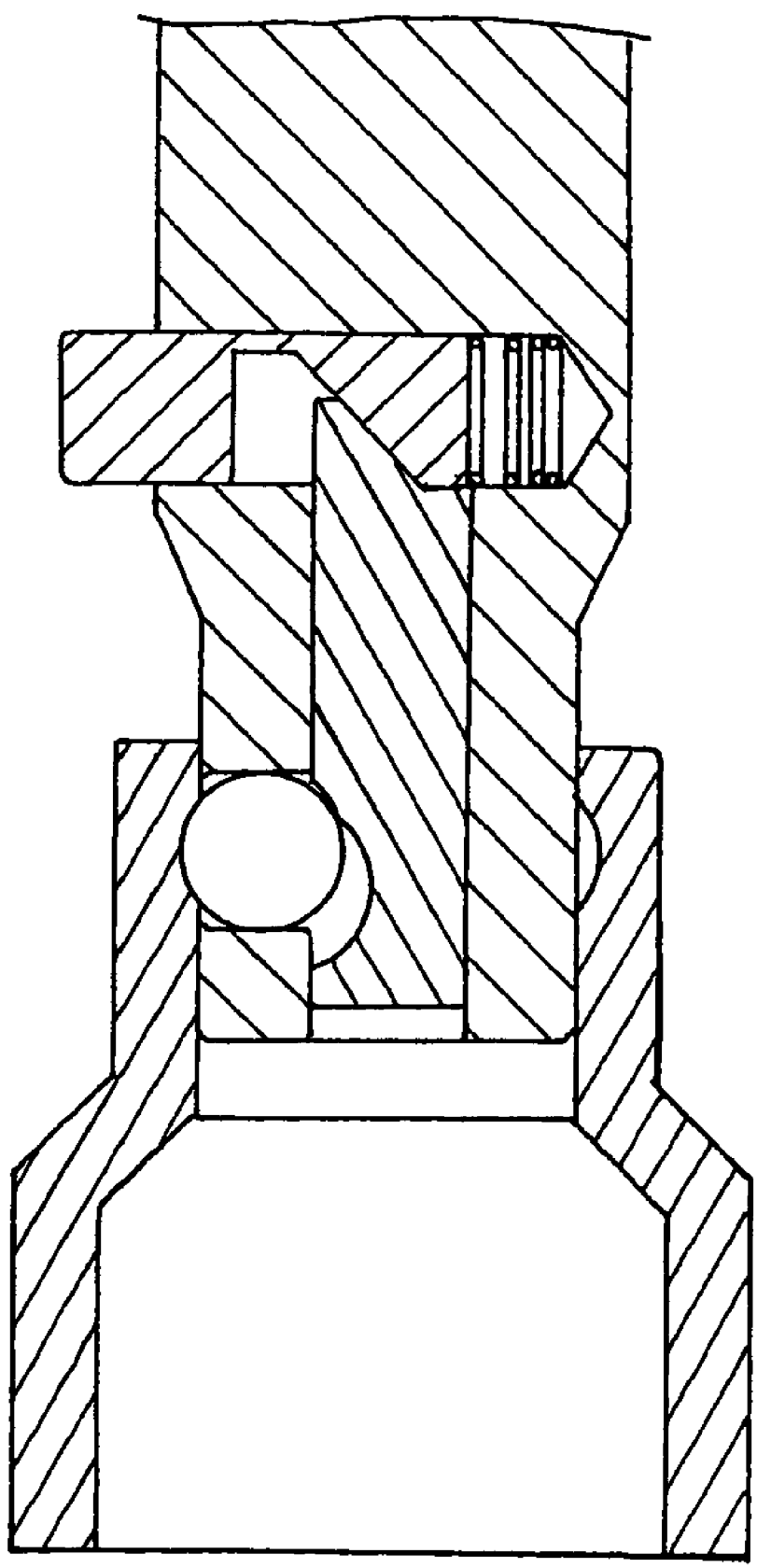
FIG. 2 is a sectional assembly view of another conventional connecting shaft.
Figure 5:
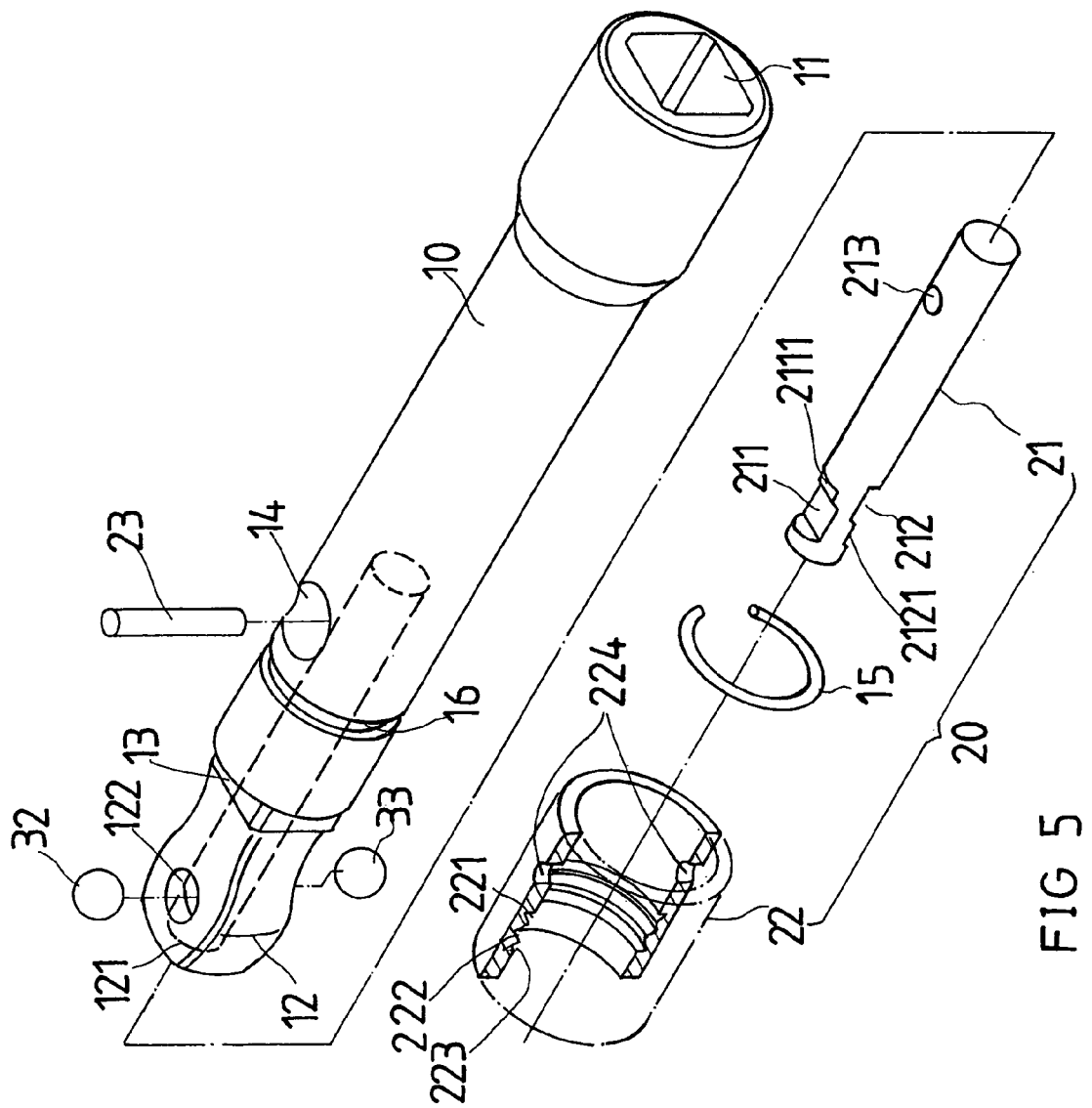
FIG. 5 is a perspective exploded view of the present invention.

Referring FIGS. 5 to 8, the present invention comprises a connecting shaft 10 for a pneumatic tool (not shown in the drawing figures), and a coupling device 20 for connecting to the connecting shaft 10 at a suitable location.

The connecting shaft 10 is longitudinal having a fixed connecting part 11 provided on one end for connecting to a pneumatic tool and a connecting part 12 on the other end for engaging with a socket 31, a shoulder 13 in corresponding to the socket 31 is disposed between the connecting part 12 and the connecting shaft 10. The fixed connecting part 11 is a hole for the axial part (not shown in the drawing figures) of the pneumatic tool to connect with. The connecting part 12 includes a curved shape, an axial hole 121 is disposed inside along its axis, ball holes 122 and 123 are formed on each side of the connecting part 12 respectively and are communicating with the axial hole 121. The ball holes 122 and 123 are formed and provided for receiving a first positioning steel ball 32 and a second positioning steel ball 33 respectively. The connecting shaft 10 includes a groove hole 14 formed therein and located close to the connecting part 12 and perpendicular to and communicating with the axial hole 121. A circular positioning groove 16 is also disposed on the connecting shaft 10 for a positioning rubber 15 to engage thereon. The function of the groove hole 14 is for positioning the coupling device 20. During manufacturing, the groove hole 14 is formed by using a drill having a large diameter in order to save expense.

The coupling device 20 comprises an axial rod 21, a sliding control element 22 and a positioning pivotal element 23. The axial rod 21 is inserted into the axial hole 121 of the connecting shaft 10. First and second concave grooves 211 and 212 are formed and provided at one end of the axial rod 21 on two sides in corresponding to the ball holes 122 and 123 of the connecting part 12. The other end of the axial rod 21 includes a pivotal hole 213 for receiving the positioning pivotal element 23 which may also be engaged through the corresponding groove hole 14 of the connecting shaft 10 for connecting with the sliding control element 22. Stopping parts 2111 and 2121 are extended from the first and second concave grooves 211 and 212 respectively, the stopping part 2111 is extended from the first concave groove 211 and located closer to the fixed connecting part 11, while another stopping part 2121 is extended from the second concave groove 212 and located closer to the connecting part 12.

The sliding control element 22 is a socket for engaging and sliding on the connecting shaft 10. A pivotal hole 224 is disposed on the sliding control element 22 in corresponding to the groove hole 14 for the positioning pivotal element 23 to go through. Three positioning circular grooves 221, 222 and 223 are disposed on the inner circumference of the sliding control element 22, the three positioning circular grooves are located closer to each other. When the sliding control element 22 moves along the the connecting shaft 10, the three positioning circular grooves 221, 222 and 223 are pressed against the positioning rubber 15.

Accordingly, when the connecting shaft 10 is connected with the socket 31, the first or the second positioning steel balls 32 and 33 may stably engage with and position the socket 31 either in a straight fixed direction or in a turning angle manner. The first and the second positioning steel balls 32 and 33 can be easily moved and operated by moving the sliding control element 22.

Referring to FIG. 7, when the connecting shaft 10 and the socket 31 are operated in a straight manner, the sliding control element 22 may be moved toward the fixed connecting part 11 to engage the positioning rubber 15 with the third positioning circular groove 223 and to move the axial rod 21 at the same time, to make the stopping part 2121 of the second concave groove 221 press against the second positioning steel ball 33 and to force the second positioning steel ball 33 to extend out of the second ball hole 123 and to lock the socket 31 to the connecting shaft 10. When it is required to take off the socket 31, we may simply move the sliding control element 22 backwards, to make the positioning rudder 15 to engage with the second positioning circular groove 222 (FIG. 6).

Referring to FIG. 8, the connecting shaft 10 and the socket 31 are allowable to be rotated relative to each other, the sliding control element 22 is moved forwards, so that the positioning rubber 15 engages with the first positioning circular rove 223, and at the same time, the axial rod 21 is also moved to make the stopping part 2111 of the first concave groove 211 to press against the first positioning steel ball 32 and to force the first positioning steel ball 32 to extend out of the first ball hole 122 and to position the socket 31 to the connecting shaft 10 and to allow the socket 31 to be rotated in different angles relative to the connecting shaft 10. When it is required to take off the socket 31, we may simply slide the sliding control element 22 to engage the stopping rubber 15 with the second positioning circular groove 222 as shown in FIG. 6.

Figure 9:
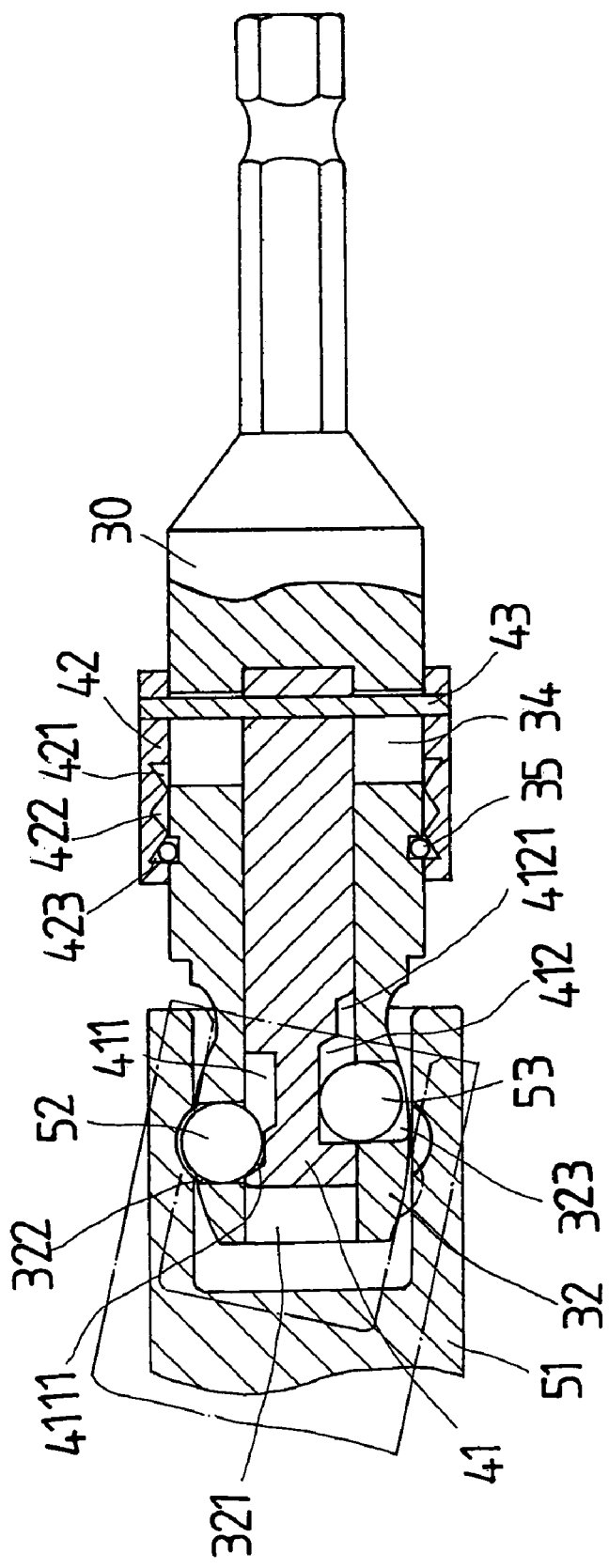
FIG. 9 is a sectional assembly view of another embodiment of the present invention.

Referring to FIG. 9, a similar connecting shaft 30 also includes a connecting part 32 provided on one end and having an axial hole 321 formed therein and extended along its axis, and having two ball holes 322 and 323 formed on two sides thereof respectively and communicating with the axial hole 321 thereof for receiving a first positioning steel ball 52 and a second positioning steel ball 53 respectively. The connecting shaft 30 also includes a groove hole 34 for receiving a positioning pivotal element 43, and a positioning rubber 35 engaged onto the connecting shaft 30, an axial rod 41 is also inserted into the axial hole 321 of the connecting shaft 10 and includes first and second concave grooves 411 and 412 formed and provided at one end on two sides in corresponding to the ball holes 322 and 323 of the connecting part 32.

The other end of the axial rod 41 is coupled to the positioning pivotal element 43 which is engaged through the groove hole 34 of the connecting shaft 30 and connected to the sliding control element 42. The positioning pivotal element 43 also includes three positioning circular grooves 421, 422 and 423 for selectively engaging with the Positioning rubber 35. The axial rod 41 includes stopping parts 4111 and 4121 extended from the first and the second concave grooves 411 and 412 respectively for engaging with and for actuating the first and the second positioning steel balls 52, 53 to engage with the socket 51 respectively.

The stopping parts 4111 and 4121 of the axial rod 41 are arranged opposite to that shown in FIGS. 6–8, and the stopping part 4111 may press against the first positioning steel ball 52 and to force the first positioning steel ball 52 to extend out of the first ball hole 422 and to position the socket 51 to the connecting shaft 30 and to allow the socket 51 to be pivoted in different angles relative to the connecting shaft 30, and the stopping part 4121 of the second concave groove 412 may press against the second positioning steel ball 53 to force the second positioning steel ball 53 to extend out of the second ball hole 323 and to lock the socket 51 to the connecting shaft 30.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A connecting shaft device comprising:
 a connecting shaft including a fixed connecting part on one end, and a connecting part on the other end for connecting to a socket, and including an axial hole formed in said connecting part, and including two ball holes formed in two sides of said connecting part respectively and communicating with said axial hole thereof, said connecting shaft including a groove hole formed therein and communicating with said axial hole thereof,
 two positioning steel balls engaged in said ball holes of said connecting shaft respectively,
 an axial rod slidably engaged into said axial hole of said connecting shaft, and including a first concave groove and a second concave groove formed in one end thereof in corresponding to said ball holes of said connecting shaft respectively, and said axial rod including a pivotal hole formed therein,
 a sliding control element being a socket body slidably engaged onto said connecting shaft and connected to said axial rod for moving said axial rod to slide relative to said connecting shaft, and to move said first and said second concave grooves to control said positioning steel balls either to fix the socket to said connecting shaft or to allow the socket to be pivoted relative to said connecting shaft, said sliding control element including a first positioning circular groove, a second positioning circular groove and a third positioning circular groove formed therein, and including a pivotal hole formed therein,
 a positioning pivotal element engaged into said groove hole of said connecting shaft and engaged into said pivotal holes of said sliding control element and said axial rod to connect said sliding control element to said axial rod, and
 a positioning rubber engaged on said connecting shaft for selectively engaging with either of said first or said second or said third positioning circular groove of said sliding control element.

2. The connecting shaft device as claimed in claim 1, wherein said two ball holes are formed in two opposite sides of said connecting part respectively.

3. The connecting shaft device as claimed in claim 1, wherein said connecting shaft includes a shoulder formed therein for engaging with the socket.

4. A connecting shaft device comprising:

a connecting shaft including a fixed connecting part on one end, and a connecting part on the other end for connecting to a socket, and including an axial hole formed in said connecting part, and including two ball holes formed in two sides of said connecting part respectively and communicating with said axial hole thereof, and including a shoulder formed therein for engaging with the socket, and including a groove hole formed therein and communicating with said axial hole thereof, two positioning steel balls engaged in said ball holes of said connecting shaft respectively, an axial rod slidably engaged into said axial hole of said connecting shaft, and including a first concave groove and a second concave groove formed in one end thereof in corresponding to said ball holes of said connecting shaft respectively, and including a pivotal hole formed therein, a sliding control element slidably engaged onto said connecting shaft, and a positioning pivotal element engaged into said groove hole of said connecting shaft and engaged into said pivotal hole of said axial rod and connected to said sliding control element, to connect said sliding control element to said axial rod and for moving said axial rod to slide relative to said connecting shaft, and to move said first and said second concave grooves to control said positioning steel balls either to fix the socket to said connecting shaft or to allow the socket to be pivoted relative to said connecting shaft.

5. The connecting shaft device as claimed in claim 4, wherein said sliding control element is a socket body slidably engaged onto said connecting shaft and includes a first positioning circular groove, a second positioning circular groove and a third positioning circular groove formed therein, and a positioning rubber is engaged on said connecting shaft for selectively engaging with either of said first or said second or said third positioning circular groove of said sliding control element.

6. The connecting shaft device as claimed in claim 4, wherein said two ball holes are formed in two opposite sides of said connecting part respectively.

* * * * *